(12) United States Patent
Kim

(10) Patent No.: US 9,041,780 B2
(45) Date of Patent: May 26, 2015

(54) METHOD OF DISPLAYING IMAGE AND DISPLAY APPARATUS FOR PERFORMING THE SAME

(75) Inventor: Dong-Gyu Kim, Yongin-si (KR)

(73) Assignee: SAMSUNG DISPLAY CO., LTD. (KR)

(*) Notice: Subject to any disclaimer, the term of this patent is extended or adjusted under 35 U.S.C. 154(b) by 1042 days.

(21) Appl. No.: 13/111,800

(22) Filed: May 19, 2011

(65) Prior Publication Data
US 2012/0098822 A1    Apr. 26, 2012

(30) Foreign Application Priority Data
Oct. 20, 2010  (KR) .................. 10-2010-0102415

(51) Int. Cl.
| | | |
|---|---|---|
| *H04N 13/04* | (2006.01) | |
| *G09G 3/00* | (2006.01) | |
| *G09G 3/36* | (2006.01) | |
| *G09G 3/34* | (2006.01) | |

(52) U.S. Cl.
CPC ....... *H04N 13/0497* (2013.01); *H04N 13/0438* (2013.01); *G09G 3/003* (2013.01); *G09G 3/3648* (2013.01); *G09G 3/342* (2013.01)

(58) Field of Classification Search
CPC .......... G02B 27/2214; G02B 27/2228; H04N 13/0497
USPC ........ 348/42, 51, 55–57; 345/57, 58, 99, 100, 345/204; 359/462, 466
See application file for complete search history.

(56) References Cited

U.S. PATENT DOCUMENTS

| | | | |
|---|---|---|---|
| 7,593,069 B2 | 9/2009 | Oh et al. | |
| 7,777,713 B2 * | 8/2010 | Hashimoto et al. | 345/100 |
| 2007/0290977 A1 | 12/2007 | Cheng et al. | |
| 2009/0237495 A1 * | 9/2009 | Kawahara | 348/56 |
| 2010/0289884 A1 * | 11/2010 | Kang | 348/58 |
| 2011/0261173 A1 * | 10/2011 | Lin et al. | 348/57 |

FOREIGN PATENT DOCUMENTS

| | | |
|---|---|---|
| JP | 08-006526 | 1/1996 |
| KR | 1020050064362 A | 6/2005 |

* cited by examiner

*Primary Examiner* — Thai Tran
*Assistant Examiner* — Mishawn Dunn
(74) *Attorney, Agent, or Firm* — Innovation Counsel LLP (57) ABSTRACT

A method of displaying image provides data of a left eye image frame to a display panel during a first period, and provides data of a black image frame during a second period that is shorter than the first period. The method also provides data of a right eye image frame during the first period, and provides the data of the black image frame during the second period. A frame period during which the black image frame is displayed in a stereoscopic image mode is thus decreased, and a frame period in which the left eye image frame or right eye image frame is displayed is increased, allowing for increased charging time and improved image quality.

23 Claims, 9 Drawing Sheets

FIG. 7E

METHOD OF DISPLAYING IMAGE AND DISPLAY APPARATUS FOR PERFORMING THE SAME

PRIORITY STATEMENT

This application claims priority under 35 U.S.C. §119 to Korean Patent Application No. 2010-102415, filed on Oct. 20, 2010 in the Korean Intellectual Property Office (KIPO), the contents of which are herein incorporated by reference in their entireties.

BACKGROUND OF THE INVENTION

1. Field of the Invention

Embodiments of the present invention relate generally to image display. More specifically, embodiments of the present invention relate to methods of displaying an image to enhance display quality, and displaying apparatuses for performing these methods.

2. Description of the Related Art

Typically, a liquid crystal display (LCD) apparatus displays a 2-dimensional plane image (hereinafter, referred to as a 2D image). Recently, demand for 3-dimensional (hereinafter, referred to as a 3D) stereoscopic image displays has grown in fields such as games, movies and so on. 3D stereoscopic image can be displayed using an LCD apparatus.

Generally, a 3D stereoscopic image is displayed using a binocular parallax principle for the two eyes of an observer. For example, since the two eyes of the observer are spaced apart from each other, the display generates slightly different images for each eye, where these images are taken at slightly different angles. These two images impart a sense of "depth" in the observer's mind.

Common methods using the binocular parallax principle can be classified into a stereoscopic type and an auto-stereoscopic type display method. The stereoscopic type method can employ passive-type polarized glasses that have a polarized filter with different polarization axes for each eye. The stereoscopic type method can also employ active-type shutter glasses, where the display periodically displays a left eye image and a right eye image according to a time-division method, and the glasses periodically open or close left and right eye shutters in sync with the displayed left and right eye images.

Faster driving is necessary to display a 3D stereoscopic image as compared to a 2D image, when left and right eye images are displayed with the above time-division method. However, the LCD apparatus typically needs a charging time sufficient for charging a data voltage to a liquid crystal capacitor, as this is how the LCD displays an image. Accordingly, the rapid display of images required for this time-division method can present challenges for LCD displays.

SUMMARY OF THE INVENTION

Example embodiments of the present invention provide a method of displaying an image that improves charging time and luminance.

Example embodiments of the present invention also provide a display apparatus for performing the method of displaying the image.

In an example method of displaying an image according to the present invention, data of a left image frame are provided to a display panel during a first period. Data of a black image frame are provided to the display panel during a second period that is shorter than the first period. Data of a right eye image frame are provided to the display panel during the first period. The data of the black image frame are provided to the display panel during the second period.

In an example embodiment, the data of the left eye image frame or the right eye image frame may be provided by outputting a first gate signal to gate lines of the display panel and outputting image data to data lines of the display panel and in sync with the outputting of the first gate signal. The data of the black image frame may be provided by outputting the first gate signal to a plurality of preset gate lines at substantially the same time, and by outputting the black data to the data lines in sync with the outputting of the first gate signal.

In an example embodiment, the method may further include providing light to the display blocks of the display panel from a plurality of light emitting blocks during a first interval, where ones of the display blocks correspond to respective ones of the light emitting blocks. The light emitting blocks are arranged in a scan direction along which the image is displayed on the display blocks of the display panel. The left eye image or the right eye image is displayed in the first interval. The method may further include blocking the light to the display blocks by the light emitting blocks during a second interval. A mixed image comprising the left eye image or the right eye image is displayed on the display blocks of the display panel in the second interval.

In an example embodiment, the method may further include opening a left eye shutter and closing a right eye shutter during an interval extending from a part of the second interval in which the mixed image comprises the black image and the left eye image, to a part of a subsequent second interval in which the mixed image comprises the black image and the right eye image. The method may further include closing the left eye shutter and opening the right eye shutter during an interval extending from a part of the second interval in which the mixed image comprises the black image and the right eye image, to a part of a subsequent second interval in which the mixed image comprises the black image and the left eye image.

In an example display apparatus according to the present invention, the display apparatus includes a display panel, a panel driver and a light source part. The display panel includes a plurality of gate lines and a plurality of data lines. The data lines cross the gate lines. The panel driver provides data of a left eye image frame or a right eye image frame to the display panel during a first period, and provides data of a black image frame to the display panel during a second period that is shorter than the first period. The light source part provides light to the display panel.

In an example embodiment, the panel driver may include a clock generator generating a first clock signal and a first clock reverse signal having a phase opposite to a phase of the first clock signal, a gate driver generating a first gate signal according to the first clock signal or the first clock reverse signal, and a data driver outputting a data voltage to the data lines in sync with an output of the first gate signal. During the first period, the gate driver may output the first gate signal to the gate lines, and the data driver may output the image data voltage in sync with the output of the first gate signal. During the second period, the gate driver may output the first gate signal to a plurality of preset gate lines, and the data driver may output a black data voltage to the data lines in sync with the output of the first gate signal.

In an example embodiment, the light source part may include a plurality of light emitting blocks arranged in a scan direction along which the image is displayed on the display panel. Each of the light emitting blocks may provide the light during a first interval in which the left eye image or the right eye image is displayed on display blocks of the display panel corresponding to respective light emitting blocks, and block the light during a second interval in which a mixed image comprising the left eye image or the right eye image is displayed on the display panel corresponding to the light emitting blocks.

In an example embodiment, the display apparatus may further include glasses having left eye and right eye shutters. The glasses may open the left eye shutter and close the right eye shutter during an interval extending from a part of the second interval in which the mixed image comprises the black image and the left eye image, to a part of a subsequent second interval in which the mixed image comprises the black image and the right eye image. The glasses may close the left eye shutter and open the right eye shutter during an interval extending from a part of the second interval in which the mixed image comprises the black image and the right eye image, to a part of a subsequent second interval in which the mixed image comprises the black image and the left eye image.

According to embodiments of the present invention, a frame period during which the black image frame is displayed in a stereoscopic image mode is decreased, and a frame period in which the left eye image frame or the right eye image frame is displayed is increased to allow sufficient charging time, and thus improve display quality.

BRIEF DESCRIPTION OF THE DRAWINGS

The above and other features and advantages of the present invention will become more apparent by describing in detail the preferred embodiments thereof with reference to the accompanying drawings, in which.

DETAILED DESCRIPTION OF THE INVENTION

Hereinafter, the present invention will be explained in detail with reference to the accompanying drawings.

Figure 1:
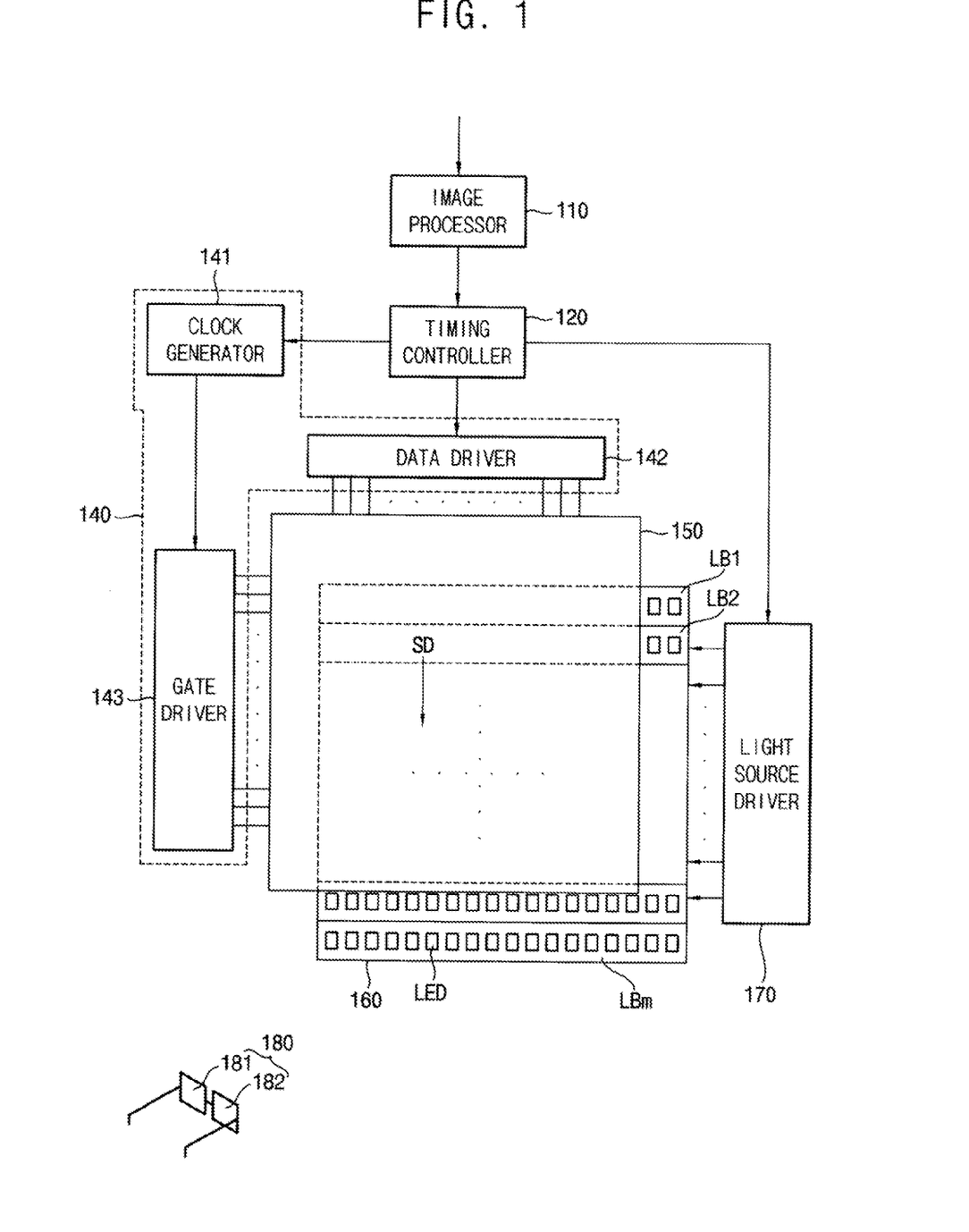
FIG. 1 is a block diagram illustrating a display apparatus according to an example embodiment of the present invention.
Figure 2A:
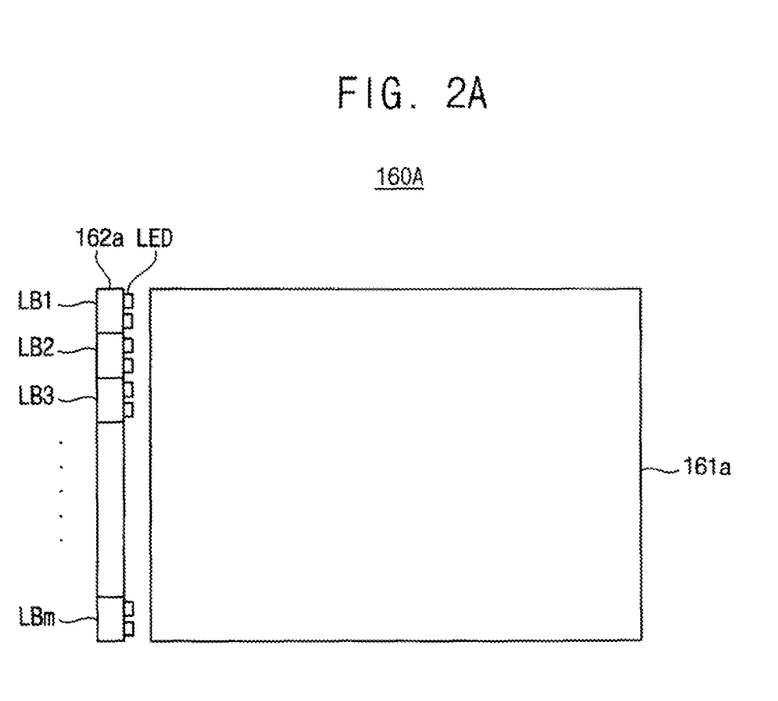
FIGS. 2A and 2B are plan views illustrating example light source parts in FIG. 1.
Figure 2B:
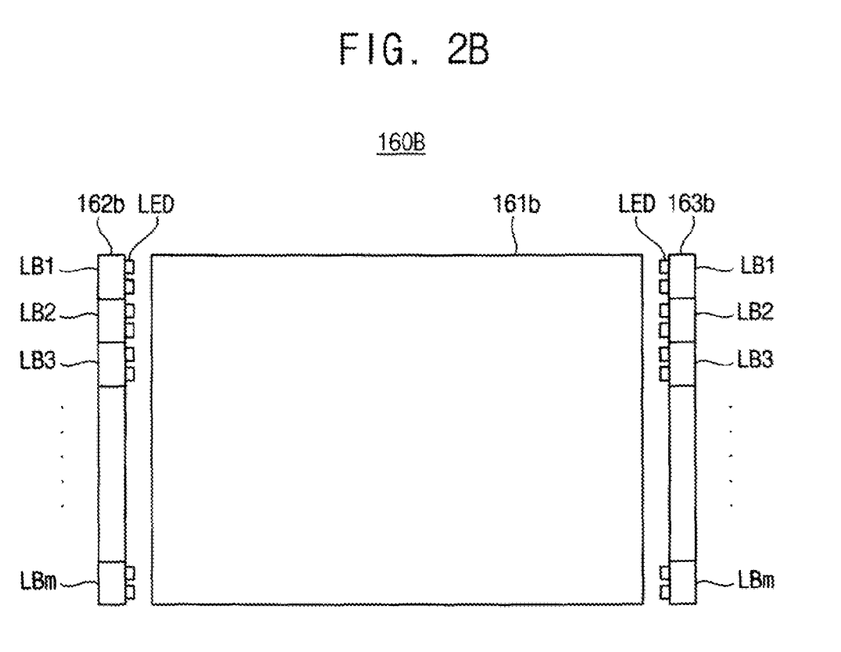

FIG. 1 is a block diagram illustrating a display apparatus according to an example embodiment of the present invention. FIGS. 2A and 2B are plan views illustrating example light source parts in FIG. 1.

Referring to FIG. 1, the display apparatus includes an image processor 110, a timing controller 120, a panel driver 140, a display panel 150, a light source part 160, a light source driver 170 and glasses 180.

The image processor 110 processes image data according to image mode. In stereoscopic image mode, the image processor 110 generates a first left eye image frame, a second left eye image frame, a first right eye image frame and a second right eye image frame from the data it receives. In two-dimensional (2D) image mode, the image processor 110 generates a first image frame and a second image frame using the received data. For example, the image processor 110 may generate an image frame at 240 Hz in stereoscopic image mode, and generate an image frame at 120 Hz in 2D image mode. That is, the 240 Hz image frame is used to display a single frame image with a frequency of 240 Hz, and the 120 Hz image frame is used to display a single frame image with a frequency of 120 Hz.

The timing controller 120 controls the panel driver 140 according to image mode, and in particular controls the frame time in which the frame image is displayed on the display panel 150. In stereoscopic image mode, timing controller 120 adjusts a frame in which a left eye image frame or a right eye image frame is displayed on the display panel 150 to a first period T1, and adjusts a frame in which a black image frame is displayed on the display panel 150 to a second period T2 shorter than the first period T1. In addition, in 2D image mode, the timing controller 120 adjusts a frame in which the first and second image frames are displayed on the display panel 150 to a third period T3 longer than the first period T1.

In addition, in stereoscopic image mode, the timing controller 120 inserts the black image frame between the left eye image frame and the right eye frame provided from the image processor 110, and provides the black image frame, the left eye image frame, and the right eye image frame to the panel driver 140. The timing controller 120 sequentially provides the left eye image frame, a first black image frame, the right eye image frame and a second black image frame, to the panel driver 140. Alternatively, in 2D image mode, the timing controller 120 sequentially provides the first and second image frames, received from the image processor 110, as-is to the panel driver 140.

The panel driver 140 includes a clock generator 141, a data driver 142 and a gate driver 143.

The timing controller 120 directs the clock generator 141 to generate a first clock signal CK1 and a first clock reverse signal CKB1 in stereoscopic image mode, and to generate a second clock signal CK2 and a second clock reverse signal CKB2 in 2D image mode. The first clock signal CK1 is high during a first horizontal period H1. The first clock reverse signal CKB1 has a phase opposite to a phase of the first clock signal CK1 during the high period H1. The second clock signal CK2 is high during a second horizontal period H2 longer than the first horizontal period H1. The second reverse signal CKB2 has a phase opposite to a phase of the second clock signal CK2 during the high period H2.

The data driver 142 converts data of the image frame provided from the timing controller 120 to an analog data voltage, and provides the analog data voltage to the display panel 150.

The gate driver 143 generates a gate signal based on a clock signal and a clock reverse signal received from the clock generator 141, and provides the gate signal to the display panel 150. In stereoscopic image mode, the gate driver 143 outputs the gate signal at a pulse width corresponding to the first horizontal period H1. In 2D image mode, the gate driver 143 outputs the gate signal at a pulse width corresponding to the second horizontal period H2, which is shorter than the first horizontal period H1.

In addition, in stereoscopic image mode, the timing controller 120 directs the gate driver 143 to output the gate signal at a pulse width H1 to each of gate lines, during which a data voltage of the left eye image frame or the right eye image frame is provided to the display panel 150. The gate driver 143 also outputs the gate signal at a pulse width H1 to preset K (K is a natural number and not less than 2) gate lines at the same time a data voltage of the black image frame is provided to the display panel 150.

According to the present example embodiment, in stereoscopic image mode, a left eye image frame, black image frame, right eye image frame and a black image frame are displayed, a period in which the data voltage of the black image frame is provided to the display panel 150 may be decreased by no more than half of a period in which the data voltage of the left eye image frame or the right eye image frame is provided to the display panel 150, and a remaining period in which the data voltage of the black image frame is provided to the display panel 150 may be spared to a period in which the left eye image frame or the right eye image frame is displayed.

For example, comparing the present example embodiment to a 240 Hz display apparatus displaying each of the left eye image frame, the black image frame, the right eye frame and the black image frame within a time period of 4 ms, the black image frame may be displayed over no more than 3 ms, and the left eye image frame or the right eye image frame may be displayed over no less than 4 ms.

According to the present example embodiment, when the image frame is displayed on a display panel having 1920× 1080 resolution, the data voltage of the left eye image frame or the right eye image frame is typically charged in about 6 ms/1080 (about 5.5 µs). The data voltage of the black image frame is typically charged in about 2 ms/1080×3 (about 5.5 µs). Thus, the first horizontal period H1 may be about 5.5 µs in stereoscopic image mode.

In addition, each of the first image frame and the second image frame is charged in about 8 ms/1080 (about 7.5 µs) in the 2D image frame. Thus, the second horizontal period H2 may be about 7.5 µs in 2D image frame.

Accordingly, the frame period during which the black image frame is displayed in the stereoscopic image mode is reduced relative to 2D image mode, and the frame period in which the left eye image frame or the right eye image frame is displayed is increased to guarantee the charging time. Accordingly, display quality may be enhanced.

The display panel 150 includes a plurality of data lines DL, a plurality of gate lines GL crossing the data lines, and a plurality of pixels. Each of the pixels may include a thin film transistor (TFT) connected to the gate and data lines, and a liquid crystal capacitor connected to the TFT.

The light source part 160 includes a plurality of light sources providing light to the display panel 150. The light source part 160 includes a plurality of light emitting blocks LB1, LB2, LB3, . . . , LBm arranged in a scan direction along which an image is displayed on the display panel. Here, "m" is a natural number. In this case, the light source may be a light emitting diode (LED). Alternatively, the light source may be any other suitable source of illumination, such as a fluorescent lamp.

The timing controller 120 controls the light source driver 170 to generate a plurality of light source driving signals for driving the light emitting blocks LB1, LB2, LB3, . . . , LBm. The light source driver 170 generates the light source driving signals to sequentially drive the light sources along the scan direction SD in the stereoscopic image mode. For example, when a mixed-image of both the left eye image and the right eye image is displayed on a first display block of display panel 150 corresponding to (i.e., positioned over) the first light emitting block LB1, a first light source driving signal has a low level. Conversely, when the left eye image or right eye image is displayed by itself on the first display block, the first light source driving signal has a high level. That is, the first light emitting block LB1 is turned off during display of a mixed-image on the first display block, and the first light emitting block LB1 is turned on during display of only the left eye image or the right eye image, so that a crosstalk between the left eye image and the right eye image may be prevented. In addition, the present example embodiment increases the frame period during which the left eye image frame or right eye image frame is displayed, thus also increasing an on period of the light source part 160. Thus, a luminance of the stereoscopic image may be enhanced.

Alternatively, the light source driver 170 can generate the light source driving signals to emit light without scan driving the light emitting blocks LB1, LB2, LB3, . . . , LBm, such as in 2D image mode. For example, the light source driver 170 provides high-level light source driving signals to each of the light emitting blocks LB1, LB2, LB3, . . . , LBm at the same time. For example, when the display panel 150 displays the 2D images, the light source part 160 can be configured to always provide light to the entire display panel 150.

The display apparatus according to the present example embodiment may include each of the light source parts in FIGS. 2A and 2B.

A light source part 160A illustrated in FIG. 2A includes a light guide plate 161a and a light emitting module 162a disposed along a shorter side of the light guide plate 161a. The light emitting module 162a may be defined as the light emitting blocks LB1, LB2, LB3, . . . , LBm on which the LEDs are mounted and which are arranged generally along the scan direction.

A light source part 160B illustrated in FIG. 2B includes a light guide plate 161b, a first light emitting module 162b disposed at a first shorter side of the light guide plate 161b, and a second light emitting module 163b disposed at a second shorter side of the light guide plate 161b. The first light emitting module 162 includes m light emitting blocks LB1, LB2, LB3, . . . , LBm on which the LEDs are mounted and which are arranged generally along the scan direction. The second light emitting module 163b also includes m light emitting blocks LB1, BL2, LB3, . . . , LBm on which the LEDs are mounted and which respectively face the m light emitting blocks LB1, LB2, LB3, . . . , LBm of the first light emitting module 162b. The m light emitting blocks LB1, LB2, LB3, . . . , LBm of the second light emitting module 163b are synchronized with the m light emitting blocks LB1, LB2, LB, . . . , LBm of the first light emitting module 162b. For example, the first light emitting block LB1 of the first light emitting module 162b and the first light emitting block LB1 of the second light emitting module 163b are driven by light source driving signals that are synchronized with each other.

In stereoscopic image mode, the glasses 180 include a left eye shutter 181 and a right eye shutter 182. The glasses 180 open the left eye shutter 181 and close the right eye shutter 182 during periods in which the left eye image is displayed on the display panel 150. In addition, the glasses 180 open the right eye shutter 182 and close the left eye shutter 181 during periods in which the right eye image is displayed on the display panel 150.

Figure 3:
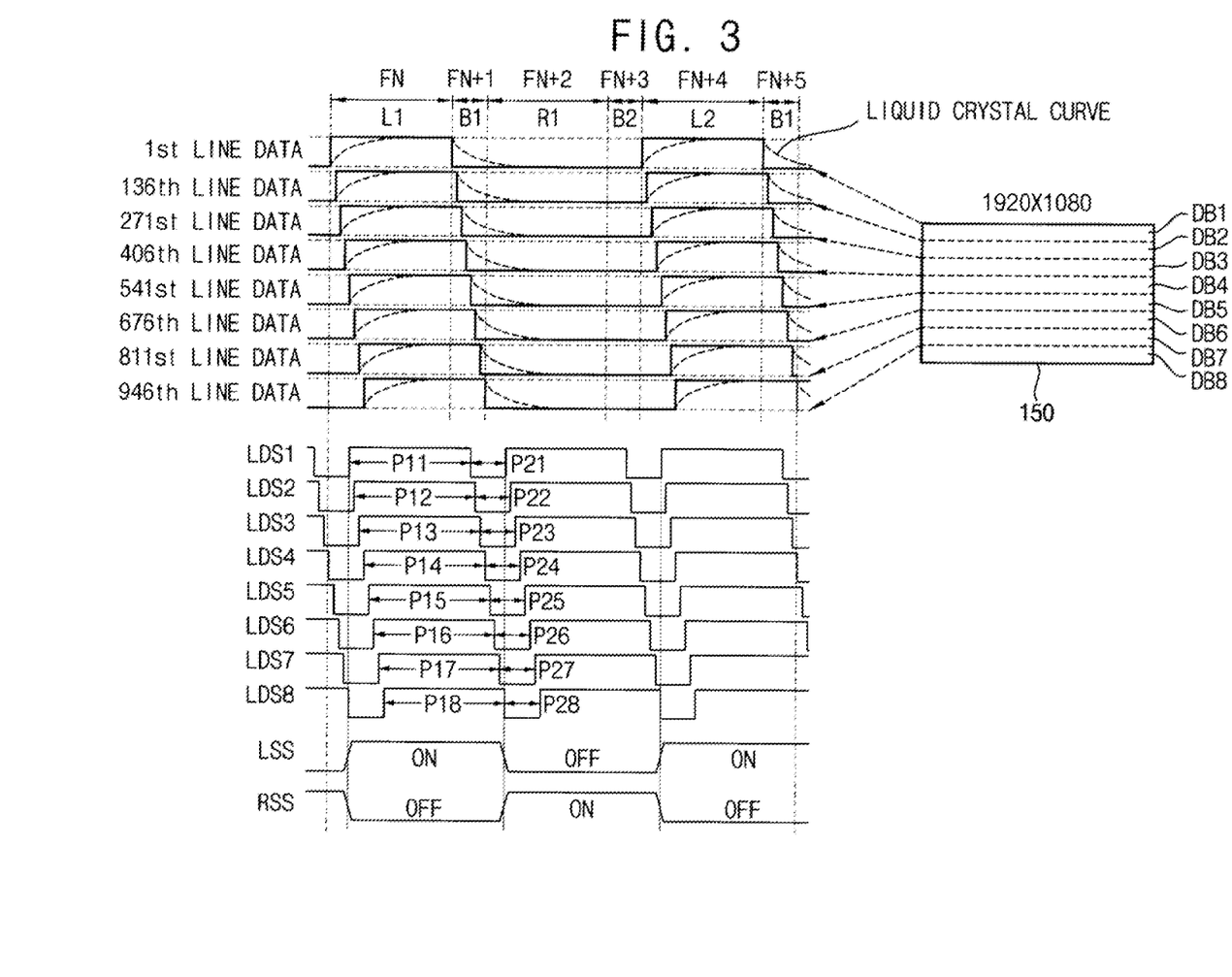
FIG. 3 is a conceptual diagram explaining a method of displaying a stereoscopic image using the display apparatus in FIG. 1.

FIG. 3 is a conceptual diagram explaining a method of displaying a stereoscopic image using the display apparatus in FIG. 1.

Referring to FIGS. 1 and 3, the panel driver 140 successively displays the left eye image L1, the first black image B1, the right eye image R1 and the second black image B2 on the display panel 150. Here, the left eye image L1 may be supposed to be a white image, and the right eye image R1 may be supposed to be a black image.

The panel driver 140 drives the display panel 150 to display the left eye image L1 during an N-th frame FN having a first period T1, to display the first black image B1 during an (N+1)-th frame FN+1 having a second period T2 shorter than the first period T1, to display the right eye image R1 during an (N+2)-th frame FN+2 having the first period T1, and to display the second black image B2 during an (N+3)-th frame FN+3 having the second period T2. Here, "N" is a natural number. As one example, the first period T1 may be about 6 ms, and the second period T2 may be about 2 ms.

For example, the panel driver 140 sequentially provides data from a first horizontal line 1st LINE of the display panel 150 to a last horizontal line 1080th LINE during one frame period, using a progressive scan method. The panel driver 150 provides the left eye image L1 to the display panel 150 during the N-th frame FN, provides the first black image B1 to the display panel 150 during the (N+1)-th frame FN+1, provides the right eye image R1 to the display panel 150 during the (N+2)-th frame FN+2, provides the second black image B2 to the display panel 150 during the (N+3)-th frame FN+3, provides the left eye image L2 to the display panel 150 during an (N+4)-th frame FN+4, and provides the first black image B1 to the display panel 150 during an (N+5)-th frame FN+5.

The display panel 150 includes a plurality of display blocks DB1, DB2, DB3, ..., DB8 respectively corresponding to the light emitting blocks LB1, LB2, LB3, ..., LB8. For example, the first light emitting block LB1 provides the light according to an image displayed on the first display block DB1. Thus, the display panel 150 displays images on the display blocks DB1, DB2, DB3, ..., DB8 using the progressive scan method, and the light emitting blocks DB1, DB2, DB3, ..., DB8 may be sequentially driven by an image scan method.

Referring to the first horizontal line 1st LINE included in the first display block DB1 of the display panel 150, the data of the left eye image L1 are provided during the N-th frame FN, the data of the first black image B1 are provided during the (N+1)-frame FN+1, the data of the right eye image R1 are provided during the (N+2)-frame FN+2, and the data of the second black image B2 are provided during the (N+3)-th frame FN+3.

Following the response speed of liquid crystals, the first horizontal line 1st LINE is changed from the second black image of a previous frame to the left eye image L1 during the N-th frame FN, is changed from the left eye image L1 to the first black image B1 during the (N+1)-th frame FN+1, is changed from the first black image B1 to the first right eye image R1 during the (N+2)-th frame FN+2, and is changed from the first right eye image R1 to the second black image B2 during the (N+3)-th frame FN+3.

In this manner, the first display block DB1 displays the left eye image L1 during a first interval P11 that is from a part of the N-th frame FN to a part of the (N+1)-th frame. The first display block DB1 displays a mixed-image changing from the first black image B1 to the right eye image R1 during a second interval P21 subsequent to the first interval P11. For example, the second interval P21 is from a remaining part of the (N+1)-th frame to a part of the (N+2)-th frame.

The first display block DB1 then displays the right eye image R1 during the first interval P11 that is from a part of the (N+2)-th frame FN+2 to a part of the (N+3)-th frame FN+3. The first display block DB1 displays a mixed-image changing from the second black image B2 to the left eye image L2 during the second interval P21 that is after the first interval P11. For example, the second interval P21 is from a remaining part of the (N+3)-th frame FN+3 to a part of the (N+4)-th frame FN+4.

The light source driver 170 is synchronized with a driving period for the first display block DB1, and generates the first light source driving signal LDS1 provided to the first light emitting block LB1 (which corresponds to the first display block DB1). For example, the first light source driving signal LDS1 is set at a high level to turn on the first light emitting block LB1 during the first interval P11, when the first display block DB1 displays the left eye image L1 or the right eye image R1. The first light source driving signal LDS1 is also set at a low level to turn off the first light emitting block LB1 during the second interval P21, when the first display block DB1 displays the mixed-image.

In similar fashion, the light source driver 170 generates second to eighth light source driving signals LDS2, LDS3, ..., LDS8 that are synchronized with the images displayed on the second to eighth display blocks DB2, DB3, ..., DB8, to control the second to eighth light emitting blocks LB2, LB3, ..., LB8.

In the present example embodiment, the duration of the N-th frame or the (N+2)-th frame is increased, the time in which the light source part 160 is turned on is increased, and thus the luminance of the stereoscopic image may be enhanced.

In the present example embodiment, the light source driver 170 is synchronized with the image of the first horizontal line of each display block, to generate the light source driving signal controlling the light emitting blocks. Alternatively, the light source driver 170 may be synchronized with an image of a middle (i.e., an intermediate) or last horizontal line of the display blocks. Accordingly, the light source driver 170 is synchronized with the image displayed by the display blocks, to generate the light source driving signal controlling the light emitting block.

The glasses 180 open or close the left eye and right eye shutters 181 and 182 in sync with the driving of the display panel 150 and the light source part 160. The left eye shutter 181 operates in response to high and low levels of a left eye shutter signal LSS, and the right eye shutter 182 operates in response to high and low levels of a right eye shutter signal RSS.

Thus, the left eye shutter signal LSS opens the left eye shutter 181 from a part of second intervals P21, ..., P28 in which a mixed-image between the second black image B2 and the left eye image L1 is displayed on the first to eighth display blocks DB1, DB2, ..., DB8, to a part of the second intervals P21, ..., P28 in which a mixed-image between a next first black image B1 and the right eye image R1 is displayed. The left eye shutter signal LSS also closes the left eye shutter 18, from the part of second intervals P21, ..., P28 in which a mixed-image between the next first black image B1 and the right eye image R1 is displayed, to the part of the second intervals P21, ..., P28 in which a mixed-image between a next second black image B2 and the left eye image L2 is displayed.

The right eye shutter signal RSS closes the right eye shutter 182, from a part of the second intervals P21, ..., P28 in which a mixed-image between the second black image B2 and the left eye image L1 is displayed, to the part of the second interval P21, ..., P28 in which a mixed-image between the next first black image B1 and the right eye image R1 is displayed. The right eye shutter signal RSS opens the right eye shutter 182 from the part of the second intervals P21, ..., P28 in which a mixed-image between the first black image B1 and the right eye image R1 is displayed, to the part of the second intervals P21, . . . , P28 in which a mixed-image between the second black image B2 and the left eye image L2 is displayed.

According to present example embodiment, in stereoscopic image mode, the frame period during which a black image frame is displayed is reduced, and the frame period during which the left eye image frame or the right eye image frame is displayed is increased, in order to provide sufficient charging time for the pixels. Accordingly, display quality may be enhanced. As the display time of the left eye image frame or right eye image frame is increased, the time during which the light source part 160 is also increased, and thus the luminance of the stereoscopic image mode may be enhanced.

Figure 4:
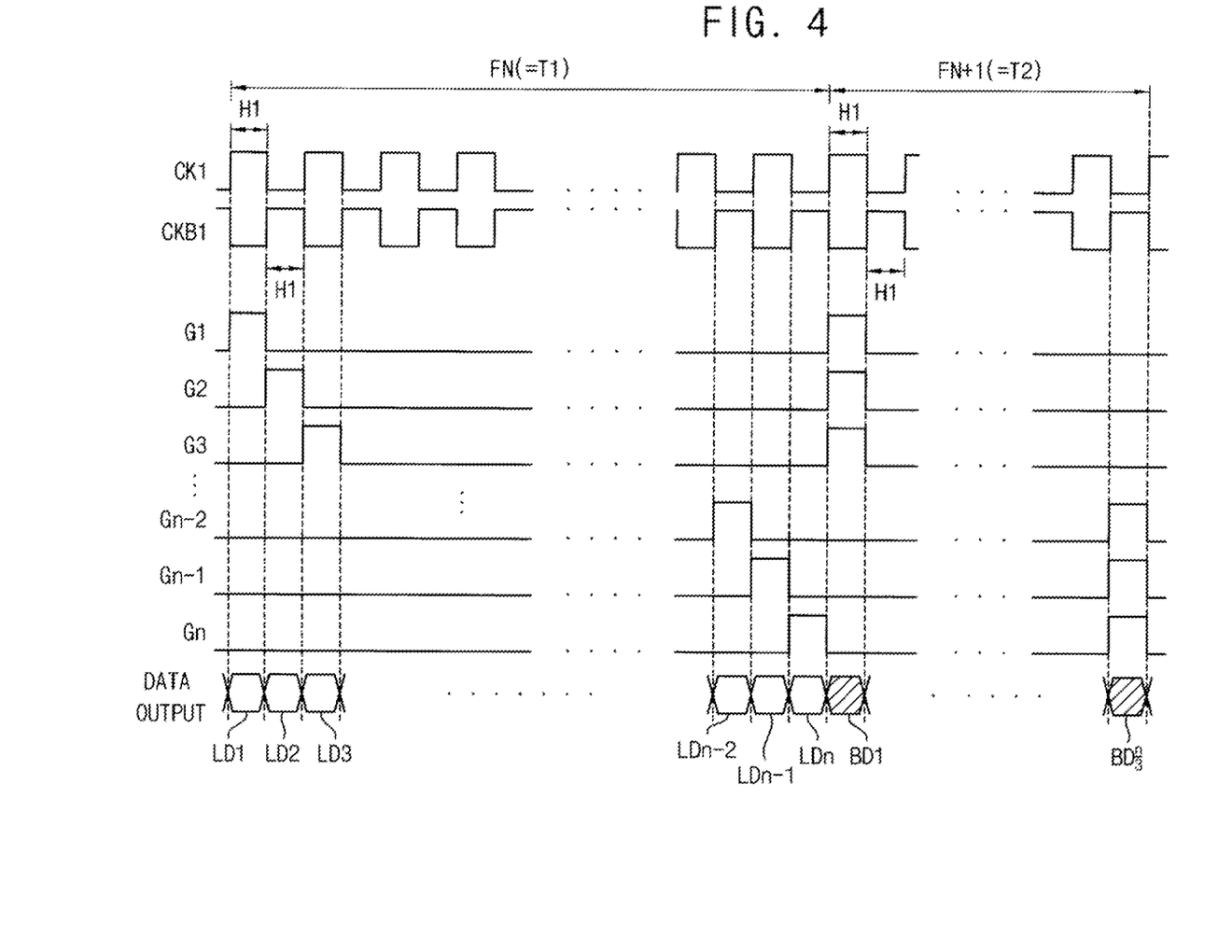
FIG. 4 is a timing diagram of signals provided to a display panel in FIG. 1 in the stereoscopic image mode.

FIG. 4 is timing diagram of signals provided to a display panel in FIG. 1 in stereoscopic image mode.

Referring to FIGS. 1 and 4, in stereoscopic image mode, the clock generator 141 generates the first clock signal CK1 and the first clock reverse signal CKB1. The first clock signal CK1 is set high for a duration equal to the first horizontal period H1, and the first clock reverse signal CKB1 is set opposite (i.e., reversed in phase) to CK1.

During the N-th frame FN, the gate driver 143 generates gate signals using the first clock signal CK1 and the first clock reverse signal CKB1, so as to display the left eye image. The gate driver 143 includes a plurality of stages respectively connected to the gate lines of the display panel 150 to output the gate signals. For example, odd-numbered stages generate gate signal having pulse widths synchronized with the high period of the first clock signal CK1, and even-numbered stages generate gate signals having pulse widths synchronized with the high period of the first clock reverse signal CKB1.

In the present example embodiment, high periods of the first clock signal CK1 and the first reverse signal CKB1 are substantially the same as the first horizontal period H1. However, this need not necessarily be the case. In the alternative, the high period may be smaller than the first horizontal period H1, to take into account an RC delay of the gate signal. For example, when the first horizontal period H1 is about 5.5 μs, the high period may be between about 3.5 μs and about 4.5 μs.

In order, the gate driver 143 outputs a first gate signal G1 synchronized with the high period of the first clock signal CK1, outputs a second gate signal G2 synchronized with the high period of the first clock reverse signal CKB1, and outputs a third gate signal G3 synchronized with the next high period of the first clock signal CK1. The gate driver 143 also outputs, in order, an (n−2)-th gate signal Gn−2 synchronized with the high period of the first clock reverse signal CKB1, an (n−1)-th gate signal Gn−1 synchronized with the high period of the first clock signal CK1, and an n-th gate signal Gn synchronized with the high period of the first clock reverse signal CKB1. Here, "n" is a natural number.

The data driver 142 is synchronized with the gate signals G1, G2, G3, . . . , Gn, to output the data of the left eye image frame to each respective horizontal line as it is activated.

Accordingly, the data driver 142 is synchronized with output of the first gate signal G1 so as to output left eye image data of a first horizontal line LD1, is synchronized with output of the second gate signal G2 so as to output left eye image data of a second horizontal line LD2, and is synchronized with output of the third gate signal G3 so as to output left eye image data of a third horizontal line LD3. The data driver 142 is also synchronized with output of the (n−2)-th gate signal Gn−2 to output left eye image data of an (n−2)-th horizontal line LDn−2, is synchronized with output of the (n−1)-th gate signal Gn−1 to output left eye image data of an (n−1)-th horizontal line LDn−1, and is synchronized with output of the n-th gate signal to output left eye image data of an n-th horizontal line LDn.

Accordingly, the left eye image frame is displayed on the display panel 150 during an N-th frame, where the N-th frame has the first period T1 (T1=H1×n). When the first horizontal period H1 is about 5.5 μs and the display panel 150 has FHD (1920×1080) resolution, the first period T1 may be about 6 ms.

The gate driver 143 generates the gate signals using the first clock signal CK1 and the first clock reverse signal CKB1, so as to display the black image during an (N+1)-th frame FN+1. The gate driver 143 includes a plurality of stages. The stages are grouped into the preset number of groups by the timing controller 120, and the stages of each group generate substantially the same gate signal. The number of grouped stages is set to correspond to the first horizontal period H1.

For example, the stages of the gate driver 143 are grouped so that each group includes three stages, and the stages of each group generate substantially the same gate signal. The gate signals from each group have a pulse width corresponding to (i.e., generally the same as) the first horizontal period H1. First, second and third stages of a first group output the first, second and third gate signals G1, G2 and G3 respectively, the signals having pulse widths synchronized with the high period of the first clock signal CK1. Likewise, (n−2)-th, (n−1)-th and n-th stages of an (n/3)-th group output the (n−2)-th, (n−1)-th and n-th gate signals Gn−2, Gn−1 and Gn having pulse widths synchronized with the high period of the first clock reverse signal CKB1.

The data driver 142 outputs the data of the black image frame in sync with the gate signals G1, G2, G3, . . . , Gn.

The data driver 142 outputs a first black data BD1 in sync with output of the gate signals G1, G2 and G3 of the first group. The first black data BD1 is charged to pixels of the first, second and third horizontal lines, as they are activated by the gate signals G1, G2 and G3 of the first group. The pixels of these three horizontal lines thus display a black image. In like manner, the data driver 142 is synchronized with an output timing of the gate signals Gn−2, Gn−1 and Gn of the (n/3)-th group, and outputs an (n/3)-th black data BDn/3. The (n/3)-th black data BDn/3 is charged to pixels of (n−2)-th, (n−1)-th and n-th horizontal lines by the gate signals Gn−2, Gn−1 and Gn of the (n/3)-th group, and displays the black image.

In this manner, the (N+1)-th frame, which is a black image frame, is displayed on the display panel 150 during period T2 (T2=H1×(n/3)). When the first horizontal period H1 is about 5.5 μs and the display panel 150 has the FHD (1920×1080) resolution, the second period T2 may be about 2 ms.

Figure 5:
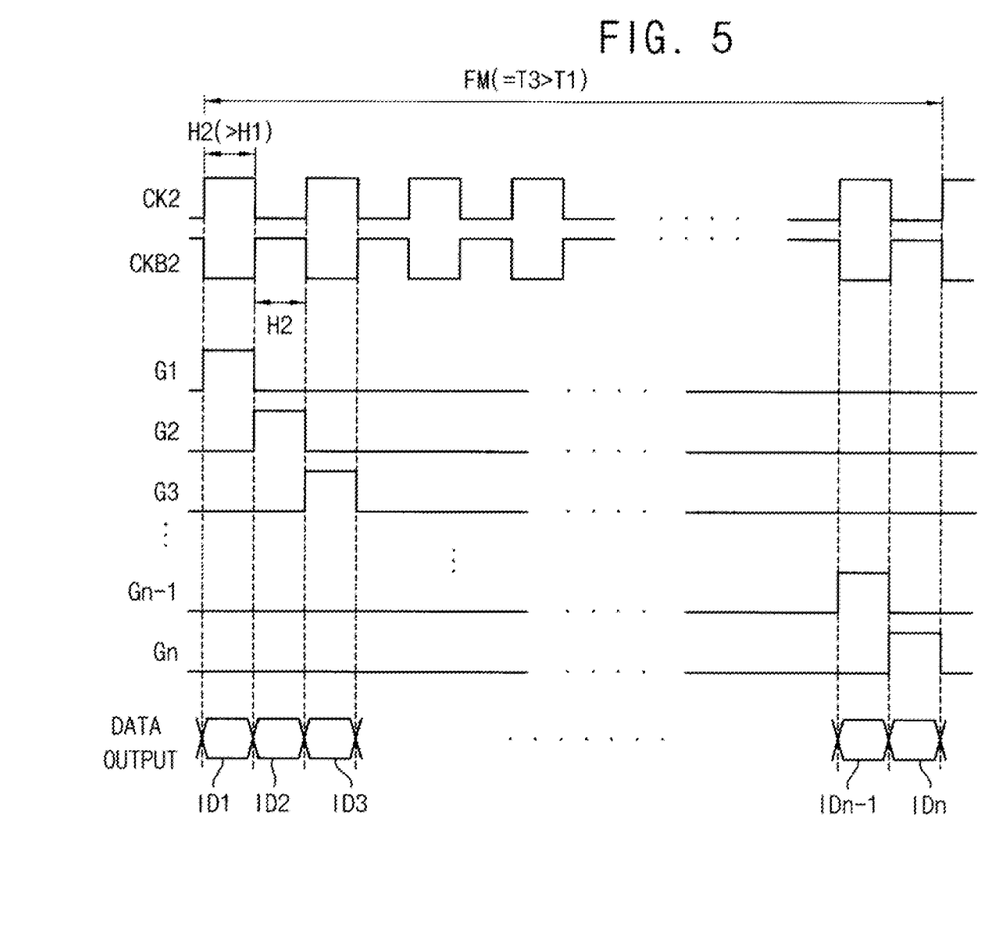
FIG. 5 is a timing diagram of signals provided to the display panel in FIG. 1 in a 2D image mode.

FIG. 5 is a timing diagram of signals provided to the display panel in FIG. 1 in 2D image mode.

Referring to FIGS. 1 and 5, in 2D image mode, the clock generator 141 generates the second clock signal CK2 and the second clock reverse signal CKB2. The second clock signal CK2 is set high for a duration equal to a second horizontal period H2. The second clock reverse signal CKB2 is opposite in phase to the second clock signal CK2, and also has a high period of duration H2. The second horizontal period H2 may be longer than the first horizontal period H1, as illustrated in FIG. 4.

The gate driver 143 generates the gate signals using the second clock signal CK2 and the second clock reverse signal CKB2, so as to display the 2D image during the M-th frame FM (where "M" is a natural number). For example, the odd-numbered stages of the gate driver 143 generate gate signals having pulse widths synchronized with high periods of the second clock signal CK2, and the even-numbered stages generate gate signals having pulse widths synchronized with high periods of the second clock reverse signal CKB2.

For example, the gate driver 143 outputs first gate signal G1 that is synchronized with the high period of the second clock signal CK2, outputs second gate signal G2 that is synchronized with the high period of the second clock reverse signal CKB2, and outputs third gate signal G3 that is synchronized with the high period of the second clock signal CK2. Similarly, the gate driver 143 outputs (n−1)-th gate signal Gn−1 that is synchronized with the high period of the second clock signal CK2, and outputs n-th gate signal Gn that is synchronized with the high period of the second clock reverse signal CKB2 sequentially. Here, "n" is a natural number.

The data driver 142 outputs the data of the image frame in sync with the gate signals G1, G2, G3, . . . , Gn.

Accordingly, the data driver 142 outputs image data of the first horizontal line ID1 in sync with the gate signal G1, outputs image data of the second horizontal line ID2 in sync with the gate signal G2, and outputs image data of the third horizontal line ID3 in sync with the gate signal G3. Similarly, the data driver 142 outputs image data of the (n−1)-th horizontal line IDn−1 in sync with output of the (n−1)-th gate signal Gn−1, and outputs image data of the n-th horizontal line IDn in sync with output of the n-th gate signal Gn.

Accordingly, the N-th image frame is displayed on the display panel 150 during the third period T3 (T3=H2×n). When the second horizontal period H2 is about 7.5 µs and the display panel 150 has the FHD (1920×1080) resolution, the third period T3 may be about 8 ms.

Figure 6:
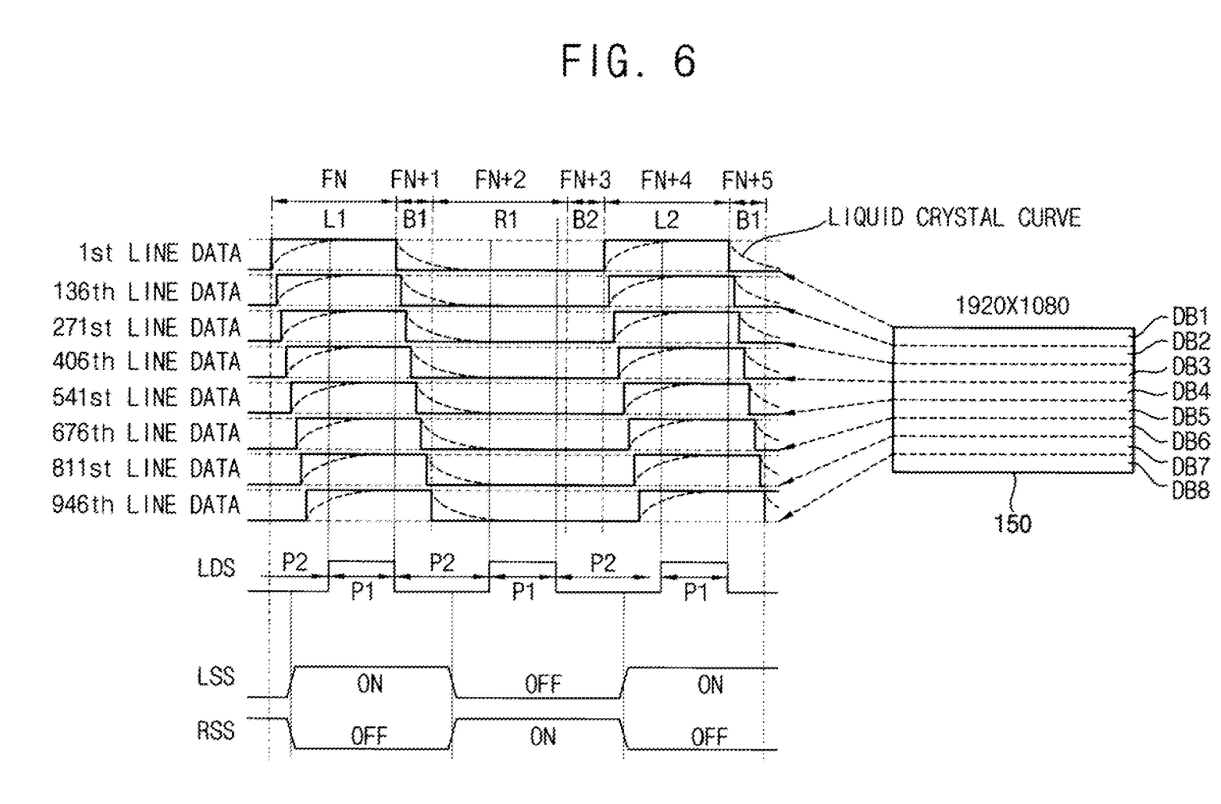
FIG. 6 is a conceptual diagram explaining a method of displaying the stereoscopic image according to another example embodiment of the present invention.

FIG. 6 is a conceptual diagram explaining a method of displaying the stereoscopic image according to another example embodiment of the present invention. A method of driving the display panel 150 and the glasses 180 according to the present example embodiment is substantially the same as that of FIG. 4, except for a light source driving signal LDS for driving the light source part 160.

Referring to FIGS. 1 and 6, the light source driver 170 generates the light source driving signal LDS to turn on and turn off the entire light source part 160.

During the N-th frame and the (N+1)-th frame, the light source driving signal LDS has a low level during the second interval P2 of the N-th frame, during which the image displayed is a mixed-image of the second black image and the left eye image. LDS is then set to a high level during the first interval P1 that is from a part of the N-th frame to a part of the (N+1)-th frame, in which the left eye image is displayed.

During the (N+2)-th and (N+3)-th frames, the light source driving signal LDS has a low level during the second interval P2 that is from a remaining part of the (N+1)-th frame to a part of the (N+2)-th frame in which the image displayed is a mixed-image of the first black image and the right eye image. LDS is then set to a high level during the first interval P1 that is from a remaining part of the (N+2)-th frame to a part of the (N+3)-th frame in which the right eye image is displayed.

Accordingly, the light source part 160 provides light to the entire display panel 150 during the first interval P1, in which the left eye image or right eye image is displayed. The light source part 160 entirely blocks the light to the display panel 150 during the second interval P2, in which in which a mixed-image of the left eye image or the right eye image is displayed.

The glasses 180 open or close the left eye shutter 181 and the right eye shutter 182 based on the left eye shutter signal LSS and the right eye shutter RSS, synchronized with a driving of the display panel 150.

The left eye shutter signal LSS opens the left eye shutter 181 from a part of the second interval P2 in which of the image is mixed between the second black image B2 and the left eye image L1, to a part of the second interval P2 in which the image is mixed between a next first black image B1 and the right eye image R1. Conversely, the left eye shutter signal LSS closes the left eye shutter 181 from the part of the second interval P2 in which the image is mixed between the first black image B1 and the right eye image R1, to a part of the second interval P2 in which the of the image is mixed between a next second black image B2 and the left eye image L2.

The right eye shutter signal RSS closes the right eye shutter 182 from the part of the second interval P2 in which the image is mixed between the second black image B2 and the left eye image L1, to the part of the second interval P2 in which the image is mixed between the next first black image B1 and the right eye image R1. Conversely, the right eye shutter signal RSS opens the right eye shutter 182 from the part of the second interval P2 in which the image is mixed between the first black image B1 and the right eye image R1, to the part of the second interval P2 in which the image is mixed between the next second black image B2 and the left eye image L2.

According to the present example embodiment, in stereoscopic image mode, the frame period in which the black image frame is displayed is decreased, and the frame period in which the left eye image frame or right eye image frame is displayed is increased to allow sufficient time to change between images. Thus, the display quality may be enhanced. As the N-th frame or the (N+2)-th frame displaying the left eye or right eye frame is increased, the time for turning on the light source part 160 is increased, and thus the luminance of the stereoscopic image mode may also be enhanced.

FIGS. 7A to 7E are plan views illustrating example light sources in the method of FIG. 6.

Figure 7A:
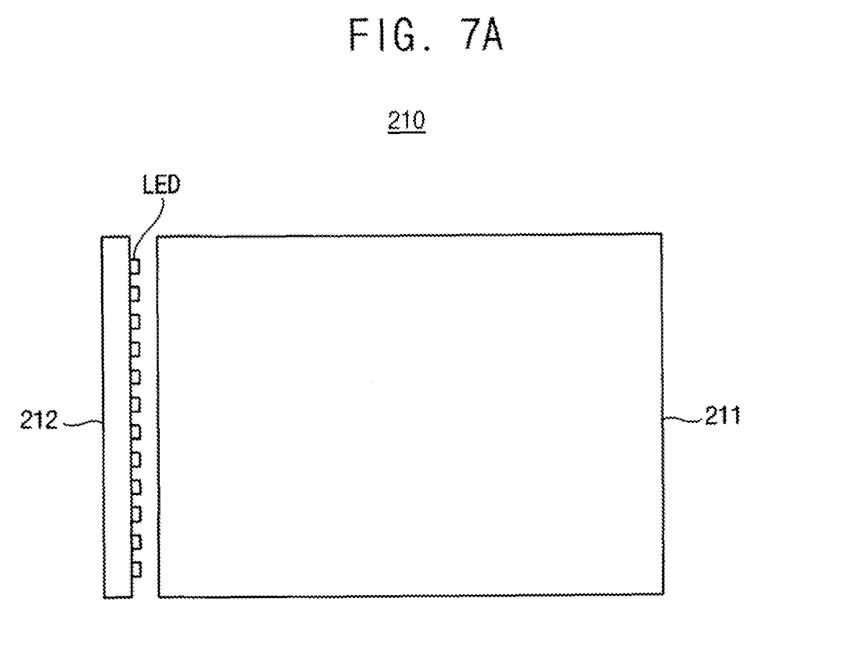
FIGS. 7A, 7B, 7C, 7D and 7E are plan views illustrating example light source parts in the method in FIG. 6.

Referring to FIGS. 1 and 7A, a light source part 210 includes a light-guide plate 211 disposed under the display panel 150, and a light emitting module 212 disposed at one of the shorter sides of the light-guide plate. The light emitting module 212 includes light sources, each of which may include an illumination source such as an LED. In this case, the light emitting module 212 includes an LED, and is disposed along a shorter side of the light-guide plate 221. Alternatively, other illumination sources such as a fluorescent lamp may be disposed along the shorter side of the light-guide plate 211.

Figure 7B:
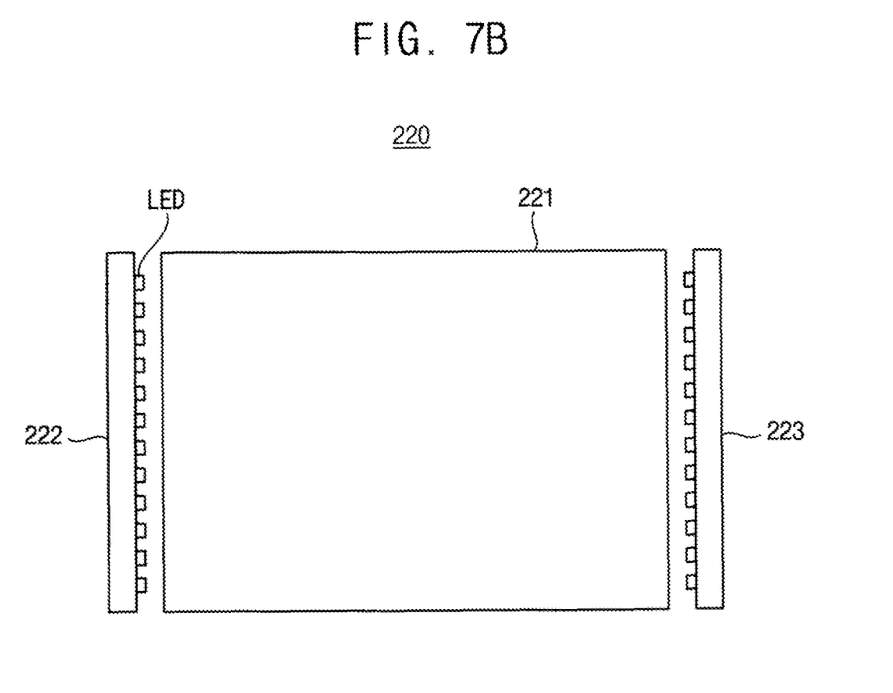

Referring to FIGS. 1 and 7B, a light source part 220 includes the light-guide plate 221 disposed under the display panel 150, a first light emitting module 222 disposed at a first shorter side of the light-guide plate 221, and a second light emitting module 223 disposed at a second shorter side of the light-guide plate 221. Each of the first and second light emitting modules 222 and 223 includes a light source, and the light source may include one or more LEDs. In this case, the first and second light emitting modules 222 and 223 are disposed at the shorter sides of the light-guide plate 221 opposite to each other. Alternatively, other illumination sources such as fluorescent lamps may be disposed at the shorter sides of the light-guide plate 221 opposite to each other.

Figure 7C:
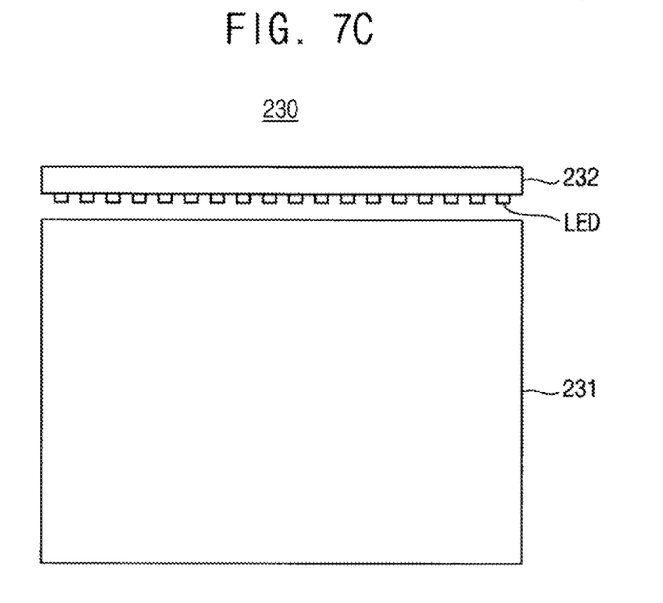

Referring to FIGS. 1 and 7C, a light source part 230 includes a light-guide plate 231 disposed under the display panel 150, and a light emitting module 232 disposed at one of the longer sides of the light-guide plate 231. The light emitting module 232 includes a light source, which in turn may include one or more LEDs. In this case, the light emitting module 232 includes LEDs, and is disposed along the longer side of the light-guide plate. Alternatively, the fluorescent lamps may be disposed along the longer side of the light-guide plate 231.

Figure 7D:
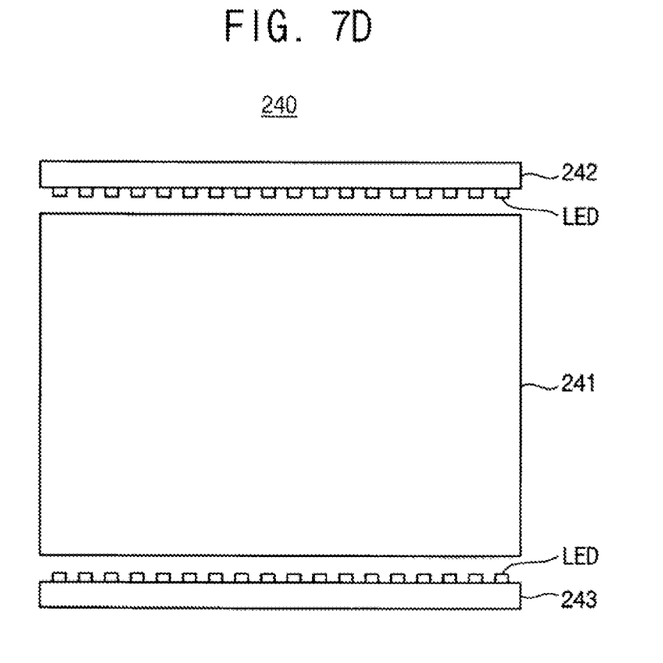

Referring to FIGS. 1 and 7D, a light source part 240 includes a light-guide plate 241 disposed under the display panel 150, a first light emitting module 242 disposed at a first longer side of the light-guide plate 241, and a second light emitting module 243 disposed at a second longer side of the light-guide plate 241. Each of the first and second light emitting modules 242 and 243 includes a light source, and the light source may include one or more LEDs. In this case, the first and second light emitting modules 242 and 243 are disposed at the longer sides of the light-guide plate 241 opposite to each other. Alternatively, other illumination sources such as fluorescent lamps may be disposed at the longer sides of the light-guide plate 241 opposite to each other.

Figure 7E:
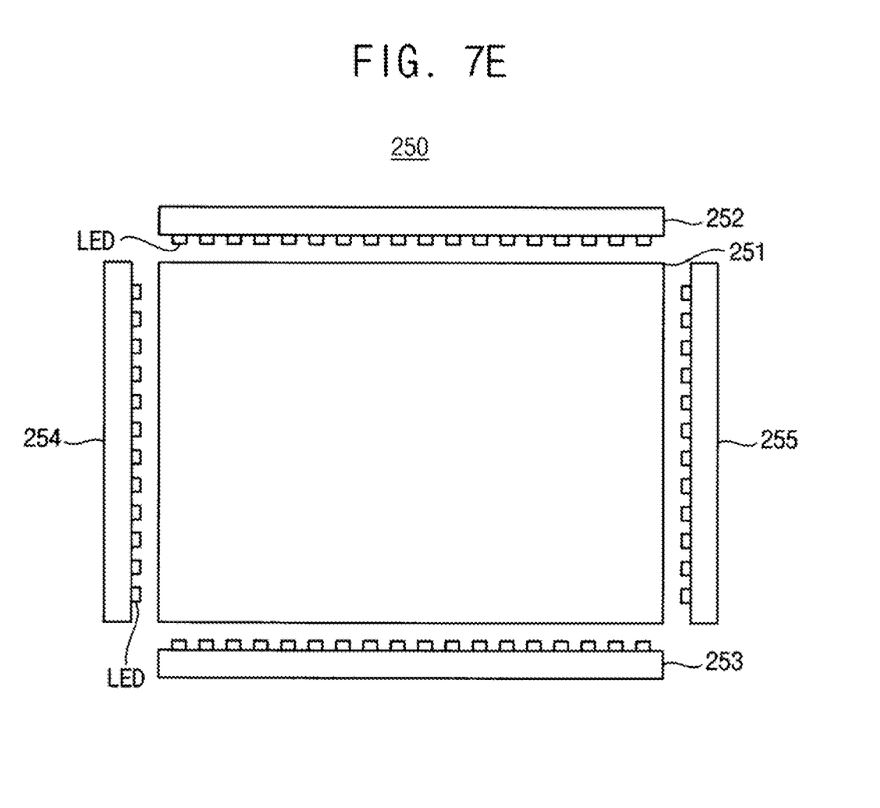

Referring to FIGS. 1 and 7E, a light source part 250 includes a light-guide plate 251 disposed under the display panel 150, a first light emitting module 252 disposed at a first longer side of the light-guide plate 251, a second light emitting module 253 disposed at a second longer side of the light-guide plate 251, a third light emitting module 254 disposed at a first shorter side of the light-guide plate 251, and a forth light emitting module 255 disposed at a second shorter side of the light-guide plate 251. Each of the first, second, third and forth light emitting modules 252, 253, 254 and 255 includes a light source, and the light source includes one or more LEDs. In this case, the first, second, third and forth light emitting modules 252, 253, 254 and 255 are respectively disposed along each of the four sides of the light-guide plate 251. Alternatively, other illumination sources such as fluorescent lamps may be disposed at the four sides of the light-guide plate 241.

While the present invention has been particularly shown and described with reference to example embodiments thereof, it will be understood by those of ordinary skill in the art that various changes in form and details may be made therein without departing from the spirit and scope of the present invention as defined by the following claims.

What is claimed is:

1. A method of displaying an image, the method comprising:
    providing data of a left eye image frame to a display panel during a first period;
    providing data of a black image frame to the display panel during a second period that is shorter than the first period;
    providing data of a right eye image frame to the display panel during a third period; and
    providing the data of the black image frame to the display panel during a fourth period that is shorter than the third period,
    wherein the data of the black image frame are provided by:
        outputting a first gate signal to a plurality of preset gate lines at substantially the same time; and
        outputting black data to data lines in sync with the outputting of the first gate signal.

2. The method of claim 1, wherein the data of the left eye image frame or the right eye image frame are provided by:
    outputting the first gate signal to gate lines of the display panel; and
    outputting image data to the data lines of the display panel and in sync with the outputting of the first gate signal.

3. The method of claim 2, further comprising:
    providing light to the display panel during a first interval in which the left eye image or the right eye image is displayed on the display panel; and
    blocking the light to the display panel during a second interval in which a mixed image is displayed on the display panel, the mixed image comprising the black image and one of the left eye image and the right eye image.

4. The method of claim 3, wherein the first interval is longer than the second interval.

5. The method of claim 3, further comprising:
    opening a left eye shutter and closing a right eye shutter during an interval extending from a part of the second interval in which the mixed image comprises the black image and the left eye image, to a part of a subsequent second interval in which the mixed image comprises the black image and the right eye image; and
    closing the left eye shutter and opening the right eye shutter during an interval extending from a part of a second interval in which the mixed image comprises the black image and the right eye image, to a part of a subsequent second interval in which the mixed image comprises the black image and the left eye image.

6. The method of claim 2, further comprising:
    providing light to display blocks of the display panel from a plurality of light emitting blocks during a first interval, ones of the display blocks corresponding to respective ones of the light emitting blocks, the light emitting blocks being arranged in a scan direction along which the image is displayed on the display blocks of the display panel, the left eye image or the right eye image being displayed in the first interval; and
    blocking the light to the display blocks by the light emitting blocks during a second interval, the mixed image comprising the black image and one of the left eye image and the right eye image and black image being displayed on the display blocks of the display panel in the second interval.

7. The method of claim 6, wherein the first interval is longer than the second interval.

8. The method of claim 6, further comprising:
    opening a left eye shutter and closing a right eye shutter during an interval extending from a part of the second interval in which the mixed image comprises the black image and the left eye image, to a part of a subsequent second interval in which the mixed image comprises the black image and the right eye image; and
    closing the left eye shutter and opening the right eye shutter during an interval extending from a part of the second interval in which the mixed image comprises the black image and the right eye image, to a part of a subsequent second interval in which the mixed image comprises the black image and the left eye image.

9. The method of claim 2, further comprising providing data of an image frame to the display panel during a fifth period that is longer than the first period.

10. The method of claim 9, wherein the data of the image frame are provided by:
    outputting a second gate signal to the gate lines of the display panel, the second gate signal having a pulse width larger than a pulse width of the first gate signal; and
    outputting the image data to the data lines and in sync with the outputting of the second gate signal.

11. The method of claim 10, further comprising continuously providing light while the image is displayed on the display panel.

12. A display apparatus, comprising:
    a display panel having a plurality of gate lines and a plurality of data lines, the data lines crossing the gate lines;
    a panel driver providing data of a left eye image frame or a right eye image frame to the display panel during a first period, and providing data of a black image frame to the display panel during a second period that is shorter than the first period; and a light source part providing light to the display panel, wherein the panel driver provides the data of the black image frame by outputting a first gate signal to first gate lines among the plurality of gate lines at substantially the same time and by outputting black data to the plurality of data lines in sync with the outputting of the first gate signal.

13. A display apparatus, comprising:

a display panel having a plurality of gate lines and a plurality of data lines, the data lines crossing the gate lines;

a panel driver providing data of a left eye image frame or a right eye image frame to the display panel during a first period, and providing data of a black image frame to the display panel during a second period that is shorter than the first period; and a light source part providing light to the display panel, wherein the panel driver comprises:

a clock generator generating a first clock signal and a first clock reverse signal having a phase opposite to a phase of the first clock signal;

a gate driver generating a first gate signal according to one of the first clock signal and the first clock reverse signal; and a data driver outputting a data voltage to the data lines in sync with an output of the first gate signal.

14. The display apparatus of claim 13, wherein, during the first period, the gate driver outputs the first gate signal to the gate lines, and the data driver outputs an image data voltage in sync with the output of the first gate signal, and wherein, during the second period, the gate driver outputs the first gate signal to a plurality of preset gate lines, and the data driver outputs a black data voltage to the data lines in sync with the output of the first gate signal.

15. The display apparatus of claim 14, wherein the light source part provides the light to the display panel during a first interval in which a left eye image or a right eye image is displayed on the display panel, and blocks the light to the display panel during a second interval in which a mixed image is displayed on the display panel, the mixed image comprising a black image and one of the left eye image and a right eye image.

16. The display apparatus of claim 15, wherein the first interval is longer than the second interval.

17. The display apparatus of claim 15, further comprising glasses having left eye and right eye shutters, wherein the glasses open the left eye shutter and close the right eye shutter during an interval extending from a part of the second interval in which the mixed image comprises the black image and the left eye image, to a part of a subsequent second interval in which the mixed image comprises the black image and the right eye image, and wherein the glasses close the left eye shutter and open the right eye shutter during an interval extending from a part of the second interval in which the mixed image comprises the black image and the right eye image, to a part of a subsequent second interval in which the mixed image comprises the black image and the left eye image.

18. The display apparatus of claim 14, wherein the light source part comprises a plurality of light emitting blocks arranged in a scan direction along which the image is displayed on the display panel, wherein each of the light emitting blocks provides the light during a first interval in which the left eye image or the right eye image is displayed on display blocks of the display panel that correspond to the light emitting blocks, and blocks the light during a second interval in which the mixed image comprising the left eye image or the right eye image is displayed on the display blocks of the display panel that correspond to the light emitting blocks.

19. The display apparatus of claim 18, wherein the first interval is longer than the second interval.

20. The display apparatus of claim 18, further comprising glasses having left eye and right eye shutters, wherein the glasses open the left eye shutter and close the right eye shutter during an interval extending from a part of the second interval in which the mixed image comprises the black image and the left eye image, to a part of a subsequent second interval in which the mixed image comprises the black image and the right eye image, and wherein the glasses close the left eye shutter and open the right eye shutter during an interval extending from a part of the second interval in which the mixed image comprises the black image and the right eye image, to a part of a subsequent second interval in which the mixed image comprises the black image and the left eye image.

21. The display apparatus of claim 13, wherein the panel driver provides data of an image frame to the display panel during a third period that is longer than the first period.

22. The display apparatus of claim 21, wherein the clock generator generates a second clock signal having a high period that is longer than a high period of the first clock signal, and a second clock reverse signal having a phase opposite to a phase of the second clock signal, wherein the gate driver outputs a second gate signal to the gate lines according to the second clock signal and the second clock reverse signal, the second gate signal having a pulse width larger than a pulse width of the first gate signal, and wherein the data driver outputs an image data voltage to the data lines in sync with the output of the second gate signal.

23. The display apparatus of claim 22, wherein the light source part continuously provides light to the display panel while the image is displayed on the display panel.

* * * * *